United States Patent
Branch et al.

(10) Patent No.: US 7,501,175 B2
(45) Date of Patent: Mar. 10, 2009

(54) FOAMED PET PACKAGING

(75) Inventors: Gregory L. Branch, Stanwood, WA (US); Wiley D. Gunter, Erie, PA (US)

(73) Assignee: MicroGREEN Polymers, Inc., Arlington, WA (US)

( * ) Notice: Subject to any disclaimer, the term of this patent is extended or adjusted under 35 U.S.C. 154(b) by 381 days.

(21) Appl. No.: 10/557,755

(22) PCT Filed: May 14, 2004

(86) PCT No.: PCT/US2004/015304

§ 371 (c)(1),
(2), (4) Date: Nov. 17, 2005

(87) PCT Pub. No.: WO2004/103828

PCT Pub. Date: Dec. 2, 2004

(65) Prior Publication Data

US 2006/0257606 A1 Nov. 16, 2006

Related U.S. Application Data

(60) Provisional application No. 60/471,477, filed on May 17, 2003.

(51) Int. Cl.
*B32B 7/02* (2006.01)

(52) U.S. Cl. ............ 428/218; 428/212; 428/217; 428/35.7; 428/220; 428/36.5

(58) Field of Classification Search ............ 428/218, 428/212, 217, 35.7, 220, 36.5
See application file for complete search history.

(56) References Cited

U.S. PATENT DOCUMENTS 5,223,545 A * 6/1993 Kumar ................... 521/51
6,012,583 A * 1/2000 Ramirez ................ 206/521.1

* cited by examiner

*Primary Examiner*—Michael C Miggins
(74) *Attorney, Agent, or Firm*—Thomas E. Loop

(57) ABSTRACT

This invention provides packages and containers produced by a solid state method for the manufacture of foamed polymeric material. The packages are suitable for pre-cooking or sterilization, insulated transport, cooking vessel, reheating, and storage of food. The gas impregnated thermoforming (GIT) process includes interleaving an article of raw polymeric material with a gas channeling means; exposing the article to a non-reacting gas at elevated pressure to achieve a desired concentration of gas within the polymer, thereby forming a partially gas-saturated article, separating it from the gas channeling means, then decompressing, foaming and forming it at a temperature below the material's melt temperature; and finally trimming it to produce a finished foamed polymeric material and recyclable scrap solid state process foamed polymer.

1 Claim, 3 Drawing Sheets

FOAMED PET PACKAGING

CROSS-REFERENCE TO RELATED APPLICATIONS

This application claims priority from U.S. Provisional Application No. 60/471,477, filed May 17, 2003, entitled THERMOFORMED FOAMED THERMOPLASTIC PACKAGING, and PCT International Application No. PCT/US2004/015304, filed May 14, 2004. entitled FOAMED PET PACKAGING.

BACKGROUND OF THE INVENTION

1. Field of the Invention

This invention relates to special receptacles or packages adapted to contain food and to receptacles used to cook food by means of a heat source. It also relates to packaging suitable for other, non-food purposes, when ease and economy of manufacture, thermal insulation, shape stability at high service or operating temperature, and heat and impact resistance are significant factors.

2. Description of the Related Art

Products in which food is packaged, prepared and served are ubiquitous in modem life. Ranging from preparation, pre-cooking, presentation, serving, cooking, storage and reheating, uses to which such products are put vary widely. Further, ranging from single-use disposable packaging, through inexpensive limited multi-use products, through durable goods, such containers vary widely in cost and durability. Manufactured from materials including laminated cardboard, thermoformed polymer, foamed polymer and injection molded polymer, such products are also of widely varying composition.

Examining uses for such products in more detail, in the United States in particular, significant industrial activity is devoted to producing single use, disposable packaging for serving food in the restaurant industry. Polystyrene foam boxes have been used for some time for food packaging as in restaurant take-out boxes. Laminated cardboard containers are also used extensively for packaging restaurant take-out food. The pizza restaurant industry is dependent to a large degree on the utility of cardboard pizza take-out boxes.

With the increasing use of prepared frozen and heat-and-serve foods, demand has multiplied for single use or limited multi-use packaging in which food is prepared, precooked and marketed by producers and then cooked and served by consumers. While frozen dinners, packaged and sold as such for later cooking by the consumer, such as claimed in U.S. Pat. No. 3,244,537, have long been a mainstay of the American table, packaged prepared meals stored on the shelf at room temperature for purchase and cooking by the consumer, such as described and claimed in U.S. Pat. No. 5,904,946 are becoming increasingly common as well.

More expensive, longer-lived plastic containers for food storage, such as depicted and claimed in U.S. design Pat. No. D277,632 or the well-known Tupperware® are useful and popular items in most American kitchens. Further, consumers have welcomed the recent availability of inexpensive limited multi-use containers for dishware, storage and cooking, such as Ziploc® brand storage containers with Snap 'n Seal lids, as depicted and claimed in U.S. design Pat. No. D476,861.

Despite the ubiquity and variety of such products, the prior art is subject to significant limitations. Few materials or packages even approach suitability for all the uses to which food packaging is subject. Some prior art packages, which serve their limited uses well, are too expensive for other uses. Others are completely incapable of use outside of their limited area of applicability. Further, there are some uses that are desirable for food packaging that are not met at all by the prior art. In addition, much prior art food packaging is recycled with difficulty, if at all, and therefore is environmentally costly.

As is well known to those in the art, polystyrene foam in the prior art is in two basic forms: thermoformed extruded sheet (ESF) and expanded bead foam (EBF).

ESF foamed polymers are created by foaming extrusion, which entails producing or forcing a non-reactive foaming gas into a molten polymer mixture or alternately creating gas with chemical reactions within the molten polymer, thereby forming bubbles in the melt. The foamed melted material is extruded as a sheet of plastic containing fine bubbles forming microcells and is then allowed to cool. For forming ESF objects, the ESF material is subsequently cured for a period of time to allow gas pressures in the microcells to become optimal for forming, after which the material is thermoformed.

Boxes made from ESF Polystyrene foam are adequate for transporting food and provide excellent thermal insulation, enabling consumers to keep restaurant food warm from purchase until later consumption. However, polystyrene foam in general has little tensile strength and containers tear easily. Further, because it has little heat resistance, polystyrene foam is unsuitable for more than brief warming in a microwave oven and is wholly unsuited to heating in a conventional oven. In addition, polystyrene foam containers generally do not seal well and so are unsatisfactory for extensive storage of food. Lastly, the geometry of objects that can be thermoformed with prior art ESF is quite limited, restricting height to depth ratios to considerably less than 1:1, and wall angles to no less than about 40 deg from vertical.

EBF foam is made by saturating polystyrene pellets with blowing agent (typically a hydrocarbon gas such as butane or pentane), followed by blowing steam through the pellets, which penetrates the beads and acts as a secondary blowing agent while it heats the beads sufficiently to cause foaming. In forming objects, the foamed beads are then transferred to a molding machine where they are compressed and further steamed causing the beads to fuse to make the desired object, such as a polystyrene cup.

EBF foamed objects may be formed with height to depth ratios over 1:1 and wall angles approaching vertical. They are produced in net shape, requiring no trimming after manufacture, and, like all polystyrene foam products, they provide excellent thermal insulation. However, EBF foamed products have the same drawbacks of polystyrene foam products generally, and, in addition, EBF foamed products have even less tensile strength and durability than ESF polystyrene foamed products.

Regardless of method of manufacture, prior art foamed packaging suffers from a number of additional significant drawbacks. Polystyrene foamed materials can't withstand high temperatures and therefore are not microwaveable or ovenable above, about the boiling point of water. In addition, such foam containers usually lack quality, tight fitting lids, reducing their utility for food storage. Finally, all prior art polystyrene foamed materials, regardless of method of manufacture, are non-biodegradable and have little value for recycling, and therefore are environmentally costly.

While coated cardboard containers may be microwaveable and, in fact, if comprised of appropriate materials, may be used for limited cooking and reheating in conventional ovens, such containers are unsuitable for extensive cooking or for storage beyond very short term. Further, the insulation properties of coated cardboard are slight, and clearly inferior to those of polystyrene foam. Furthermore, because of non-degradable, non-recyclable laminations due to the plastic coatings required for significant food contact life, many such containers are scarcely more recyclable than polystyrene foam.

Prior art pizza boxes, generally composed of corrugated cardboard, serve to insulate and transport the food. Most are rectangular in shape and many are not dimensioned for heating in home microwave ovens, and the cardboard material is unsuitable for use in a conventional oven. Further, prior art pizza boxes are unsuitable for long-term storage, because they do not seal tightly, allowing pizza to become stale, and the cardboard material decomposes as it absorbs oils and liquids from food contained therein. While some prior art has employed foamed polymer for pizza boxes, as in U.S. Pat. No. 4,848,543, such prior art comprises boxes principally of polystyrene foam. Not only is such foam subject to the general limitations of polystyrene foam containers noted above, but its low heat resistance makes it unsuitable for receiving pizza immediately after cooking.

While polymer containers for frozen and other pre-cooked foods are commonly microwavable, many such containers are not adaptable for cooking in conventional ovens. Some solid polymer containers, such as those of highly crystallized PET (CPET) are useable in both microwave and conventional ovens. Solid polypropylene containers can be heated to about the temperature of boiling water for sterilization, but cannot withstand oven cooking temperatures. Foil containers, while almost obsolete, are unusable in microwave ovens. Regardless of suitability for microwave or oven, all such containers generally provide little if any thermal insulation for foods and are therefore unsuitable for maintaining foods at serving temperature. In addition, such containers usually lack quality, tight fitting lids, reducing their utility for food storage. Further, both foil and solid polymer containers are considerably more costly to produce than foamed polymer containers.

Longer-lived containers of the Tupperware sort provide excellent food storage but provide little thermal insulation. Such containers are not heat resistant and so, while they may be used for fast heating in microwave ovens, they are unsuitable for longer cooking times and may not be used in conventional ovens. In addition, such containers cost many times the cost of other containers considered herein. While the newer, shorter-lived multi-use containers are considerably less expensive, they also suffer from shortcomings in insulation capability and heat resistance.

Yet a further limitation applicable to much of the prior art processes for production of food containers is that scrap material from the manufacture of such containers is generally of little value and, in fact, may require costly disposal. Accordingly, the configuration of prior art food containers is often constrained by the need to minimize the scrap produced in their manufacture, thereby resulting in containers that are less than optimally shaped for their purpose.

What is needed are food containers suitable for pre-cooking or sterilization, insulated transport, use as a cooking vessel, reheating, and storage of food. What is needed further is an economical way of producing such containers at low cost. What is yet further needed is a process for producing such containers whereby there is little economic constraint on container shape. What is yet further needed are such containers that are also environmentally sound.

It has recently been discovered that polymer foam articles may be produced on an industrial scale by a novel process, gas impregnated thermoforming (GIT). In U.S. Pat. No. 5,684,055 to Kumar et al., incorporated herein by reference in its entirety, a roll of polymer sheet is provided with a gas channeling means interleaved between the layers of polymer. The roll is exposed to a non-reacting gas at elevated pressure for a period of time sufficient to achieve a desired concentration of gas within the polymer. The saturated polymer sheet is then separated from the gas channeling means and bubble nucleation and growth is initiated by heating the polymer sheet. After foaming, bubble nucleation and growth is quenched by cooling the foamed polymer sheet. The foamed sheet may then be thermoformed.

As further elaborated in PCT patent application number PCT/US2004/015246, titled METHOD OF PRODUCING THERMOFORMED ARTICLES FROM GAS IMPREGNATED POLYMER, filed contemporaneously herewith and incorporated herein by reference, such process is suitable for foaming with a wide range of gas/polymer systems comprised of non-reacting gas and amorphous or semi-crystalline thermoplastic polymer materials, including $CO_2$ with polyethylene, polyethylene terephthalate(PET), polyvinyl chloride, acrylonitrile butadiene styrene, polycarbonate, and polypropylene, while $N_2$ may be used with polystyrene.

In U.S. Pat. Nos. 5,223,545 and 5,182,307 to Kumar et al., both incorporated herein by reference in their entirety, PET is shown to have its crystallinity levels raised by saturation with high pressure CO2 gas. Furthermore it has been shown that the crystallizing gas remains in the polymer for a time in substantial quantities after foaming and enhances crystallization during thermoforming.

It has been further been discovered that objects made from such foams possess surprising qualities that render such objects particularly suited for food packaging applications. Based upon these discoveries, it is an object of this invention to provide food containers suitable for pre-cooking or sterilization, insulated transport, use as a cooking vessel, reheating, and storage of food. It is a further object of this invention to provide an economical way of producing such containers at low cost. It is yet a further object of this invention to provide food packaging that is more ecologically sound for more varied applications than is available in the prior art.

BRIEF SUMMARY OF THE INVENTION

The present invention utilizes the gas impregnated thermoforming (GIT) process to manufacture packages and containers of foamed PET with optional integral skins of variable crystallinity. These containers may be used to store food at all stages of the cooking process. The packages are suitable for pre-cooking or sterilization, insulated transport, cooking vessel, reheating, and storage of food. The versatility of the package is made possible by the inherent nature of the material. It insulates to keep hot food hot and cold food cold. The package is advantageous over other disposable materials since it contains no solvent residues or other undesirable chemicals that can spoil the taste, quality, or safety of the food.

The high temperature resistance of highly crystallized PET, whether just on the surface of containers or extending into the container's interior, makes it possible for the consumer to cook food right in the box without fear of melting it. The insulating characteristics of the foam material enhance maintenance of serving temperature. The cut resistant integral skin makes the box attractive for cutting the food directly thereon. It is also advantageous to serve the food directly from the container. The cracking resistance and stability of the material over a wide temperature range make it possible or desirable to refrigerate or freeze unconsumed leftovers directly in the same container. The thermal shape stability of highly crystallized PET at higher temperatures makes it advantageous to reheat the food in a microwave, convection, or conventional oven directly in the box. Finally, the entire package may be recycled, owing to the integral nature of the skins with their inherent chemical similarity to the core foam, lack of flammable gases, and lack of chemical change to the polymer during or required by the foaming process.

If a plasticizing gas is used for gas impregnation, the plasticity of the polymeric material may be greatly enhanced, substantially lowering the viscosity of the material at a given temperature. The positive pressure remaining in microcells of materials foamed by the solid state gas impregnation process immediately after foaming further greatly enhances the formability of such materials. Accordingly, for embodiments that are plasticized and/or foamed by gas impregnation, it is possible to thermoform containers of geometries hitherto unattainable.

Because of the substantially 100% recycleability of foam materials created according to the present process, round containers, and other shapes that would normally be prohibitive in ESF due to the relatively large amount of trim are especially feasible. This allows containers to be fabricated in shapes more optimized for the application, having properties such as improved aesthetics, improved heat retention, etc.

BRIEF DESCRIPTION OF THE DRAWINGS

Other objects, advantages, features and characteristics of the present invention, as well as methods, operation and function of related elements of structure, and the combination of parts and economies of deployment, will become apparent upon consideration of the following description and claims with reference to the accompanying drawings, all of which form a part of this specification, wherein:

DETAILED DESCRIPTION OF THE INVENTION

The present invention is packaging for food products made from foamed polyethylene terepthalate (PET) or easily crystallized grade polyethylene terepthalate (C-PET). PET and C-PET have advantageous food contact properties in that they do not release unscrubbed monomers such as styrene or residual solvents into the food. Solid skins enhance the aesthetic appearance, sanitation, and abrasion resistance of this material compared to competing foam surfaces.

Figure 1:
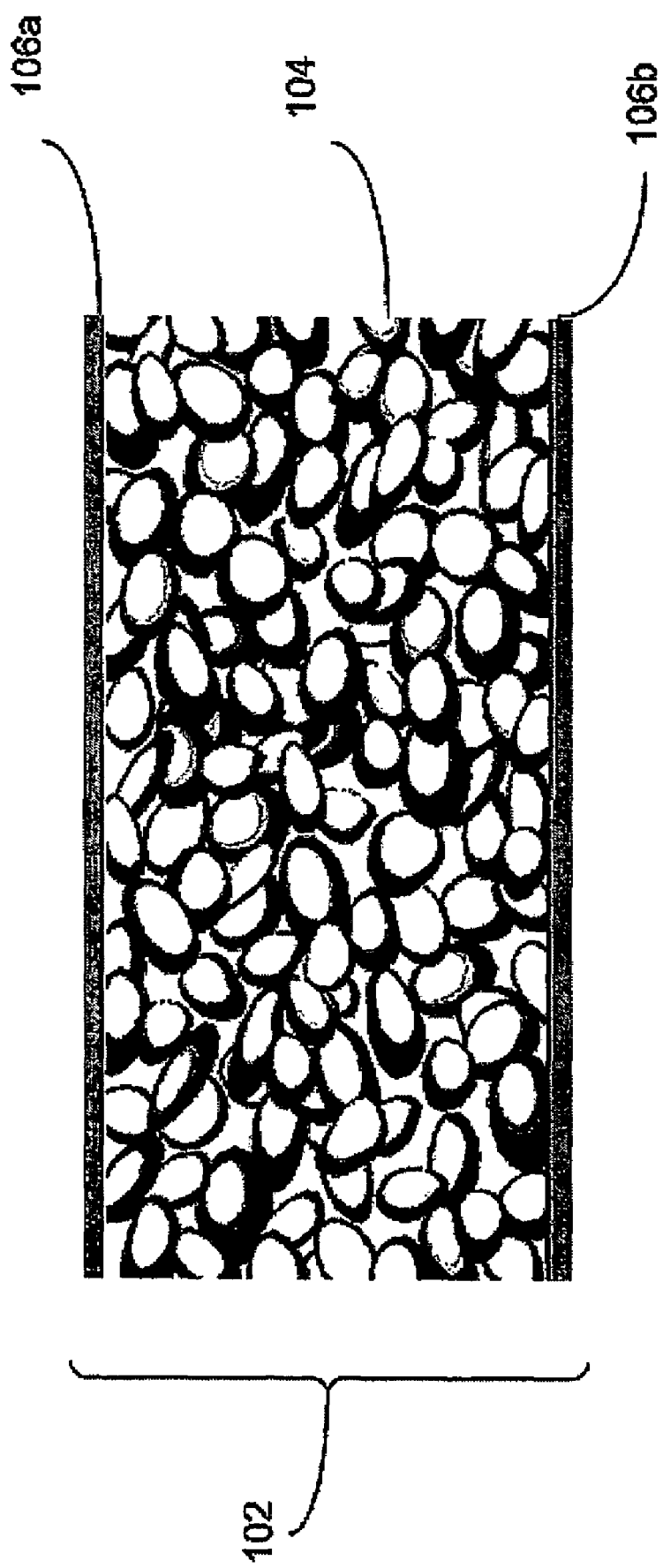
FIG. 1 is a cross-sectional view of a foamed thermoplastic having an integral skin.

Turning now to FIG. 1, illustrated is a sheet 102 of foamed polymer material. In the center of sheet 102 is foamed polymer 104 which may possess a density of about 5% to about 99.9% of the density of unfoamed polymer. Surfaces 106*a* and 106*b*, which may be substantially identical to each other, are solid skins comprised of unfoamed polymer. The thickness of each of skins 106*a* and 106*b* may vary from about 3% or less to about 25% or more of the total cross-sectional thickness and can be determined by controlling values of certain manufacturing parameters as set forth below.

Two different processes are involved in the formation of skins on polymeric materials foamed according to the present invention. First, it has been discovered that when materials of semi-crystalline polymers, such as PET, polypropylene and syndiotactic polystyrene, are held under pressure of a plasticizing gas, they tend to crystallize over time, the crystallization proceeding inward from the exposed surface of the polymeric material. Therefore, in such gas-impregnated polymeric materials held under pressure, there is a gradient of crystallinity that declines from the surface to the interior of the material.

Associated with each semi-crystalline polymer is a threshold value for percentage of crystallinity, which, if exceeded, results in material that, even though gas-impregnated, foams at a much higher temperature than the same polymer at lower percentages of crystallinity, if indeed such crystalline gas-impregnated material will foam at all. For PET, for example, the threshold percentage is about 19% crystallinity. As these semi-crystalline polymeric materials are held under plasticizing gas pressure and their crystallinity increases over time from the surface inward, and as the percent crystallinity along the crystallinity gradient of the material increases above this threshold value, the depth of material that will not foam increases. On decompression and optional heating as taught by the present invention, the inner portion of the material that is below the threshold value will foam, while the surface portion of the material that is above the threshold crystallinity value will remain unfoamed, thereby forming a skin of unfoamed polymer having a higher crystallinity than the interior, foamed polymer.

In forming a highly crystallized skin on the foamed polymer according to the foregoing, referring back to FIG. 1, surfaces 106*a* and 106*b* would correspond to portions of the polymeric material that had been crystallized above the threshold value, while foamed inner section 104 corresponds to a portion of the material whose crystallinity is below the threshold value. The highly crystallized skin possesses attributes generally associated with higher crystallinity in such polymers, such as improved heat resistance, shape stability at high temperature, and strength. The skin so produced is of the same exact material chemistry as the original polymer.

A second process enabling formation of skins on polymeric materials foamed according to the present invention is a result of the fact that the solvated gas desorbs from the polymer surface after decompression. If polymer subsequent to gas impregnation is allowed to desorb a portion of the solvated gas prior to bubble nucleation and formation, when the polymer is finally foamed, it will possess an integral skin of thickness proportional to the amount of solvated gas that was desorbed.

Such skins can be formed because solvated gas desorbs from the material at its surface, with desorption resulting in a declining gradient of solvated gas concentration in the polymer material closer to the surface of the sheet. As the solvated gas concentration drops in the localized material at the surface, the surface of the polymer sheet to a certain depth is no longer nascent foam and remains unfoamed material during subsequent processing, thereby forming an integral skin. Referring again to FIG. 1, for materials in which skins are formed by this process, 106*a* and 106*b* would correspond to areas of the polymer where the solvated gas had desorbed after decompression to the point where the area did not contain sufficient solvated gas to foam, while foamed area 104 would correspond to the interior of the polymeric material where sufficient gas had remained solvated to cause foaming. The depth of this skin depends upon the amount of desorption that has taken place prior to foaming, and therefore is dependent upon temperature, overall pressure, partial gas pressure, and time allowed for the decompressed impregnated polymer to desorb gas prior to foaming. The polymer in skins formed by this second process need not have a level of crystallinity that is appreciably higher than that of the polymer in the foam beneath it. The skin so produced is of the same exact material chemistry as the original polymer.

By controlling variables related to these two processes for skin formation, both the depth and the crystallinity of integral skin formed in polymers foamed according to the present invention may be controlled, whereby the attribute conferred to the material by the skin, such as heat resistance, high temperature shape stability, gas impermeability, stain resistance, enhanced appearance and so on, may be optimized while the material overall possesses the positive attributes of foam. By balancing the thickness of highly crystallized, heat stable skin against the amount of lower crystallinity higher ductility core, containers may be fabricated which optimize these advantageous properties.

Figure 2:
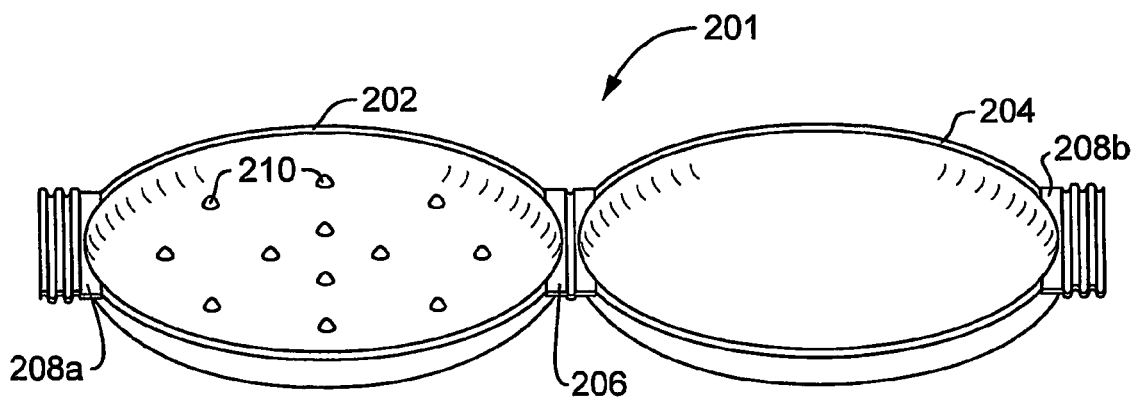
FIG. 2 is an isometric view of a food package having features for ease-of-use and for maintaining food quality.
Figure 3:
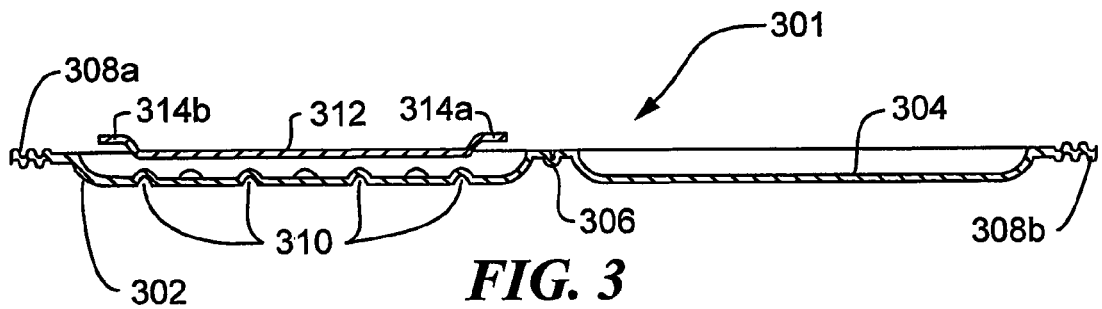
FIG. 3 is a cross-sectional view of the food package of FIG. 2.

FIG. 2 is an isometric view of a food package 201 formed by the GIT process. FIG. 3 is a cross sectional view of the box in FIG. 2 along a vertical plane through its mid-line. These figures represent a pizza container. Turning to FIG. 2, bottom 202 may be optionally joined to top 204 via a living hinge 206. Alternatively, the pieces may be formed separately. In a preferred embodiment, the bottom 202 or both top and bottom 204 and 202 of pizza container 201 are formed foam or partially foamed material fabricated according to the GIT process. Pizza container 201 may include one or more handles 208, indicated as separate handles 208a and 208b, to make it easier to handle a container with hot contents. Bumps, protrusions, or ridges 210, which may be embodied as other equivalent features, may be formed on the inside floor of the container to keep the crust of the pizza substantially away from the bottom of the container. These features can help enhance the crispness of the crust and also provide a place for excess oil to drain. Pizza container 201 may be formed as a round or ovoid shape or as a square or rectangle. A round container is especially attractive due to its improved aesthetics and is economically feasible to produce despite the fact that such a shape generates considerable trim waste, owing to the recyclability of the trim material.

Turning now to FIG. 3, wherein is depicted pizza box 301 comprised of bottom 302 connected to top 304 via live hinge 306 with optional handles 308a and 308b, the pizza box may have an optional inner tray 312 that acts as a baking, cutting, and/or serving tray. The tray may be shaped substantially the same as the outer box, having one or more handles 314 to ease removal and handling. The outer box may be formed of relatively low density foam, while the inner tray is formed of relatively high density foam having a higher crystallinity. To facilitate cutting, the tray may be made at a higher density or with a thicker unfoamed integral skin (as explained in U.S. Pat. No. 5,684,055) than required for the box. Higher crystallinity of the inner tray imparts higher temperature stability and allows it to act as a baking sheet. The lower density outer box enhances thermal insulation during transport. In preferred embodiments, the foam has a density of 5 to 50% relative to unfoamed PET (the density of unfoamed PET being about 1.31 gm/cc). In especially preferred embodiments, the box has a relative density of 5-25%, while the tray's relative density ranges from 8%-35%. In preferred embodiments of the pizza box and allied applications, the crystallinity level of the PET foam is 19-35%.

The inner tray 312 may be raised off the bottom of the outer box by bumps 310, for example, to further improve thermal isolation from the exterior. Alternatively, concave upward bumps may be formed in the tray itself or other features can be added, such as drain holes to allow oil and grease to seep away from the food into the bottom of the outer box. In a preferred embodiment, the upper surface of the inner tray 312 is relatively flat and smooth to facilitate cutting.

The pizza box 201, 301 of FIGS. 2 and 3 may be delivered to or taken home by the consumer with a cold or hot pizza inside. If hot, the high temperature resistance of C-PET makes it possible for the consumer to cook the pizza right in the box without fear of melting it. The insulating characteristics of the foam material enhance maintenance of serving temperature. The cut resistant integral skin makes the box attractive for cutting the pizza directly thereon. It is also advantageous to serve the pizza directly from the container. The cracking resistance and wide thermal stability of the material make it possible or desirable to refrigerate or freeze unconsumed leftovers directly in the same container. The high thermal stability of highly crystallized PET makes it advantageous to reheat the pizza in a microwave, convection, or conventional oven directly in the box. Finally, the entire package may be recycled, owing to the integral nature of the skins with their inherent chemical similarity to the core foam, lack of flammable gases, and lack of chemical change to the polymer during or required by the foaming process.

The round shape of the pizza box of FIGS. 2 and 3 is advantageous with respect to heat retention. Insofar as heat retention is a function of surface area, a round box has 78.54% of the surface area of an equivalently dimensioned square box ( ). Therefore, a round pizza box will keep the pizza warmer longer.

The food container of FIGS. 2 and 3 is also amenable to other food applications such as take-and-bake cookie box with integral cookie sheet or other brown-and-serve applications.

Because of the substantially 100% recyclability of foam materials created according to the present process, round containers and other shapes that would normally be prohibitive due to the relatively large amount of trim with ESF are especially feasible. This allows containers to be fabricated in shapes more optimized for the application, having properties such as improved aesthetics, improved heat retention, etc.

Figure 4:
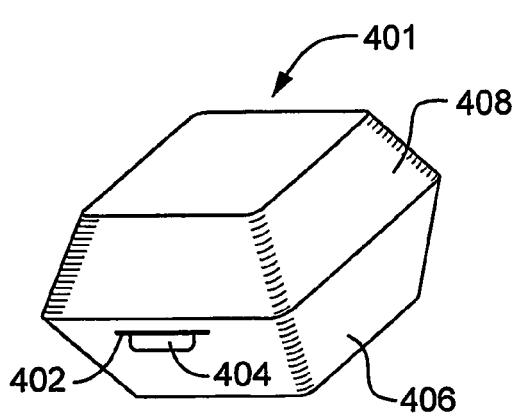
FIG. 4 is an isometric view of a rectangular food package.
Figure 5:
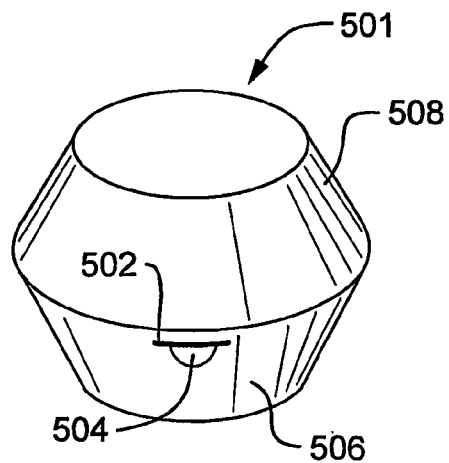
FIG. 5 is an isometric view of another food package.

FIGS. 4 and 5 are isometric views of other embodiments of food containers. FIGS. 4 and 5 include a closure comprising slot 402 and tabs 404. The closures shown are functionality features and may be included in the pizza box described in reference to FIGS. 2 and 3 above. The food container 401 of FIG. 4 includes bottom 406 and top 408. Optionally, top 408 or a portion thereof may be left unfoamed, and therefore transparent to maximize aesthetic qualities. This is accomplished by not exposing that portion of the package to heat until after outgassing has been completed. Bottom 406 and optionally top 408 may be foamed to maximize rigidity and insulating qualities.

FIG. 5 illustrates a circular food container. Circular container 501 closes via slot 502 and tab 504 and comprises circular bottom 506 and top 508. Such a shape is especially feasible with the present material technology because of the substantially 100% recyclability of the waste produced by die cutting. It is a preferred embodiment because its reduced surface area enhances thermal insulation qualities.

The containers of FIG. 2 through 5 are indicative of various aspects of a broad variety of applications. For example, many restaurants have take out boxes, the majority of which are made from polystyrene foam. Customers are offered the boxes to take home leftover portions of their meal. The polystyrene foam box easily tears, and cannot be put into the oven microwave to reheat. The present invention, when made from PET foam is durable, has superior insulation value to polystyrene, and food can be reheated in the oven or microwave without removal from the box. All or most of the steps necessary for preparation, storage, transport, eating, and storage of leftovers can be accomplished without removing the food from the package.

Another application of the present invention is reusable or semi-disposable PET foam food containers. The packages described here are semi-disposable, but at a cost similar to that of single use conventional foam packages. They can be sealed with a matching foam lid, solid plastic lid, or cling film for storage, and can also be used for food storage in the fridge or freezer and can be reused. A separate serving/cooking tray may be incorporated to fit inside the box and may be of a higher density and toughness than the outside box to optimize the inner tray for cutting.

Advantages of semi-disposable packages of the present invention compared to existing heavier solid plastic containers, lighter thinner solid containers, or foamed plastic containers include:

1. Lower cost due to reduced material and the use of significant recycled material content.
2. Higher rigidity even with less material used due to increased wall thickness.
3. Increased insulation to keep hot foods hot and cold foods cold longer for travel or "lunch box" use.
4. Increased versatility, with multi-use containers permitting pre-cooking, freezing, cooking, serving, storage, reheating, etc., owing to integral skin, use of high crystallinity pet foam and internal tray.
5. Lower environmental cost of disposable packaging because up to 100% recycled content may be used to create PET foam.
6. Greater service temperature range due to the choice of PET or C-PET material.
7. Enhanced functionality: in some embodiments, the use of a separate internal tray of higher density foam allows preparation, cooking, cutting, and serving without the side of the container interfering with the access to the food and with enough strength to allow processing and eating steps; the outer container is of lower density to add insulation and reduce costs; and the tray is prevented from sliding within the box by its handles and corresponding slots or notches in the box into which the handles snap.

Because of the plasticizing effect of gas impregnation with plasticizing gas, it is possible to thermoform foamed containers according to the present invention having geometries unattainable in the prior art. As described above in relation to prior art thermoforming of polystyrene foam, heretofore the limitations in such art restrict formed foamed containers to height to depth ratios to considerably less than 1:1, and wall angles to no less than about 40 deg from vertical. However, embodiments of the present invention practicing thermoforming of materials plasticized by gas impregnation are not subject to these limitations, enabling forming of articles with height to depth ratios of 1.2 or greater and wall angles approaching vertical. While not illustrated, as will be clear to those of skill in the art this invention thereby advantageously permits thermoforming of many desirable objects, such as foamed polymer cups, for example.

Figure 6:
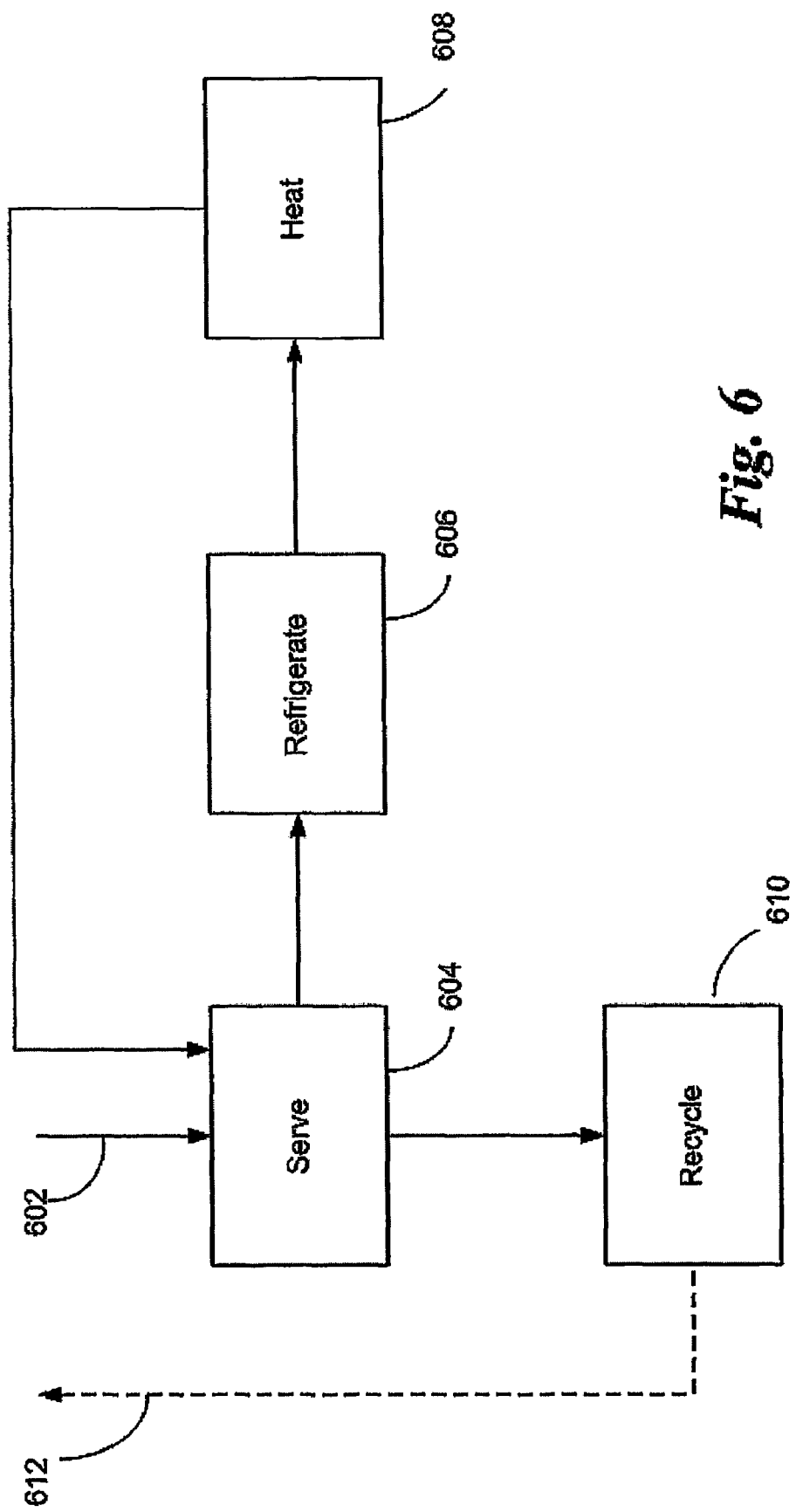
FIG. 6 is a block diagram showing details of consumer use of a food package made according to the process of the present invention.

FIG. 6 is a block diagram illustrating use of the containers by the consumer. As indicated, containers described herein may be used for multiple functions, including initial delivery 602 (with enhanced insulation of hot or cold foods), serving 604, storage 606 (in a refrigerator or freezer, for example), reheating 608 and subsequent use 604. Finally, because of the elimination in chemical alteration of the material during processes, as described in PCT application number, PCT/US2004/015245, titled MANUFACTURE OF FULLY RECYCLABLE FOAMED POLYMER FROM RECYCLED MATERIAL, filed contemporaneously herewith and incorporated herein by reference, the material may be recycled in its entirety 610.

The utility of foamed objects is greatly enhanced when they are partially crystallized. Such objects may possess service or operating temperatures as high as 200 deg. C. and therefore are well adapted to many food preparation and service uses as well as other high temperature applications. By way of comparison, the maximum service temperature of non-crystalline PET (commonly called APET) is on the order of only 70 deg. C.

Because of the high strength of the foam core, a high strength of integral skin, and selectively variable crystallinity, permitting deep draw, hi-temperature resistance in highly crystallized polymers, and high impact strength when crystallinity is low, a very wide variety of advantageous packages may be created in the spirit of the present invention, of which the following are exemplary:

EXAMPLE 1

A pizza box used to sell frozen pizza.

EXAMPLE 2

Pizza boxes for "take and bake" pizza. The box is both used for transport and for cooking food in a conventional oven.

EXAMPLE 3

Pizza boxes for cooked pizza right out of the oven and insulated during the trip home by the consumer. "Take out pizza"

EXAMPLE 4

"Brown and serve" rolls. Frozen rolls designed to be cooked frozen for immediate serving.

EXAMPLE 5

Cookie dough frozen on cookie sheets to bake directly in the oven.

EXAMPLE 6

Hot fried chicken insulated while being taken home, then stored and reheated, etc. all in the same container.

EXAMPLE 7

Plastic foam butter or yogurt tubs pre-sterilized, filled and sealed under sterile conditions. Wall angles nearly vertical and depth to width over 1:1,

EXAMPLE 8

Hot drink cups, that insulate, are recyclable, are made form 0-100% recycled content, etc. Wall angles nearly vertical and depth to width over 1:1

EXAMPLE 9

Non-food application such as steam or heat sterilizing in the package before or after sealing or snap fastening a cover to reuse and re-sterilize.

CONCLUSIONS, RAMIFICATIONS, AND SCOPE

Accordingly, it can be seen that the invention described herein provides foamed polymer articles made by an environmentally friendly process. The versatility of the package is made possible by the inherent nature of the material. It insulates to keep hot food hot and cold food cold. The package is advantageous over other disposable materials since it contains no solvent residues or other undesirable chemicals that can spoil the taste, quality, or safety of the food. Crystallinity of the foamed material may be selectively varied to balance high impact strength with thermal resistance and formability Although the detailed descriptions above contain many specifics, these should not be construed as limiting the scope of the invention but as merely providing illustrations of some of the presently preferred embodiments of this invention. Various other embodiments and ramifications are possible within its scope, a number of which are discussed in general terms above.

While the invention has been described with a certain degree of particularity, it should be recognized that elements thereof may be altered by persons skilled in the art without departing from the spirit and scope of the invention. Accordingly, the present invention is not intended to be limited to the specific forms set forth herein, but on the contrary, it is intended to cover such alternatives, modifications and equivalents as can be reasonably included within the scope of the invention. The invention is limited only by the claims appended hereto and their equivalents.

We claim:

1. A two-part foamed polyethylene terephthalate (PET) container, comprising:
    an upper foamed polyethylene terephthalate (PET) part having a first integral skin and a first density, wherein the first integral skin has a first surface weight percent crystallinity; and
    a lower foamed polyethylene terephthalate (PET) part connected to the upper foamed polyethylene terephthalate (PET) part, wherein the lower part has a second integral skin and a second density, and wherein the second integral skin has second surface weight percent crystallinity; and
    wherein the second density is greater than the first density, and wherein the second surface weight percent crystallinity is greater than the first surface weight percent crystallinity.

* * * * *